Patented June 20, 1939

2,163,223

UNITED STATES PATENT OFFICE 2,163,223

PROCESS FOR OBTAINING PRODUCTS OF POLYMERIZATION OF ACETYLENE

Mario Zavka, Terni, Italy, assignor to Ammonia Casale Società Anonima, Lugano-Massagno, Switzerland No Drawing. Application July 31, 1936, Serial No. 93,742. In Italy November 9, 1935

1 Claim. (Cl. 260—678)

The present invention relates to a process for thermic polymerization of acetylene which permits obtaining simultaneously aromatic hydrocarbons and monovinylacetylene.

Many industrial processes have been proposed for obtaining aromatic hydrocarbons by thermic polymerization of acetylene, but none of them affords the possibility of obtaining together with said hydrocarbons also monovinylacetylene. This hydrocarbon has been obtained together with other acetylenic hydrocarbons only by polymerizing acetylene at temperatures below 100° C. in the presence of liquid catalysts.

Contrary to what occurs in other processes, the process forming the object of the present invention permits obtaining simultaneously aromatic hydrocarbons and monovinylacetylene by thermic polymerization of acetylene at temperatures of 300 to 800° C. in the presence of solid catalysts. The process is by preference operated at atmospheric pressure or at a pressure slightly higher than atmospheric pressure.

The apparatuses required for operating the present process consist essentially of a reaction apparatus in which the thermic polymerization of acetylene is caused to occur, and of the apparatuses destined to separate the products formed from the gaseous mixture which issues from the reaction apparatus. It should be noted that not all of the acetylene which passes over the catalyst polymerizes: therefor the gaseous mixture issuing from the reaction apparatuses contains acetylene which has not polymerized, and which after separation of the products formed, can be sent either to the same reaction apparatus through which it has already passed or to another reaction apparatus. Thus it is possible to operate with a closed circuit or with an open circuit of apparatuses in a manner perfectly analogous to what is done for catalytic synthesis of ammonia and of methanol. When operating with a closed circuit of apparatuses a circulating pump or a blower can be used to cause the gases to circulate through the circuit.

The polymerization reaction of acetylene is strongly exothermic so that it is possible to heat the reaction apparatuses without any consumption of heat from external sources by heating the gas sent to the reaction by means of recuperated heat: the heat exchangers necessary for this purpose can be placed inside or outside the reaction apparatus; they can also be placed partly inside and partly outside said apparatus. Through these heat exchangers one can send all of the gas going to the reaction or only part of it, the quantity of gas being regulated at will, and so also all of the gas issuing from the catalytic space or only part of it.

In operating the present process it is possible to employ either acetylene only or acetylene mixed with other gases, such as nitrogen, carbon dioxide, methane, hydrogen. Naturally the presence of such other gases tends to diminish the production capacity of the reaction apparatuses; in practise however such diminution is slight since the acetylene content of the gas sent to the reaction apparatuses is at least 60%; with acetylene content lower than 60% the diminution of production capacity can be avoided by increasing the pressure at which the polymerization is caused to occur.

As catalysts can be used metals, such as gold, molybdenum, silver and their alloys; also alloys of iron, aluminium, silicon and chrome; a catalytic action is also exercised by the carbon obtained by decomposition of acetylene at high temperatures; it is also possible to use as catalysts the oxides of titanium, uranium and xirconium. It is preferable to place the catalysts on porous supports such as porous porcelain, carbon, silica gel, pumice stone, asbestos.

In the construction of the apparatuses required, care must be taken that the parts thereof which come into contact with acetylene, especially hot acetylene, are constructed of, or at least lined with materials which do not exercise on the acetylene a catalytic action which might determine undesired reaction. To this end we have found particularly suitable:

Steels having low carbon content (0.1 to 0.2%) and high content of nickel (18 to 26%) and of chrome (20 to 30%), such as steels commercially known as "NCT" or "NCT₃" made by F. Krupp A. G. of Essen, Germany.

Steels having extremely low carbon content (0.01 to 0.05%) and containing up to 3.5% aluminum and 1% silicon, and from 4 to 24% chrome and possibly small quantities (less than 1%) of molybdenum and/or vanadium, such as steels commercially known as "Sicromal 6" or "Cicromal12" made by Vereinigte Stahlwerke A. G. of Dusseldorf, Germany.

Generally the use of said steels is necessary for those parts of the apparatuses in which the temperature exceeds 450° C.; with temperatures lower than 450° C. it is also possible to use aluminium and its alloys, such as for example Anticorodal or Chromaluminium.

Instead of the steels or alloys mentioned it is also possible to use acid or neutral refractory materials or enamels.

As stated higher up there issues from the reaction apparatus a gaseous mixture consisting of the products of polymerization and of acetylene which has not polymerized. To separate from said mixture the products of polymerization which it contains one can either cool the mixture to low temperature (—60° to —80° C.) thereby condensing all of the products, or better still one can cool the mixture to ordinary temperature thereby condensing a part of the less volatile products and then cause the remaining products to be absorbed by suitable absorbing agents, either solid or liquid. Among the solid absorbing agents which can be employed, we mention: kieselguhr, fuller's earth, active carbon and boneblack; and among the liquid absorbing agents: tetraline, decaline, mixtures of higher alcohols, mineral oils.

Whether the separation of the reaction products is effected entirely by means of cold, or whether it is effected by cold and absorption agents, it is of course advisable to operate the cooling by means of a series of coolers which are traversed in succession by the gaseous mixture and so arranged as to obtain a fractional condensation of the products. Instead of a series of ordinary coolers it is also possible to employ a series of rectification columns and thus obtain simultaneously the condensation and the rectification of the products.

Example I

Acetylene is caused to pass through the tube made of $NCT_3$ steel and filled with rolls made out of wire mesh of which the wires are constructed of an alloy of iron, aluminium, silicon and chrome containing 2.5% aluminium, 0.8% silicon and 20% chrome. The temperature inside said tube is kept at 680° C. The gaseous mixture issuing from the tube is first cooled to ordinary temperature, the product thus condensed is collected and the mixture is then made to pass over active carbon. Of the total product thus obtained 26% condenses by effect of the cooling and the remaining 74% condenses on the active carbon.

The fractional distillation of the product condensed by cooling gives

Beginning of the distillation 75° C.

| | Percent by weight |
|---|---|
| From 75° C. to 85° C. distils | 11.8 |
| From 85 to 200° distils | 32.0 |
| From 200 to 260° distils | 21.8 |
| From 260 to 360° distils | 23.0 |
| Residue at 360° | 11.4 |

The fractional distillation of the product absorbed by active carbon gives:

Beginning of the distillation —5°.

| | Percent by weight |
|---|---|
| From —5 to 75° C. distils | 10.6 |
| From 75 to 85° distils | 54.7 |
| From 85 to 200° distils | 15.3 |
| From 200 to 260° distils | 10.5 |
| From 260 to 360° distils | 8.4 |
| Residue at 360° | 0.5 |

Of the fraction —5° C.+75° C. obtained by fractional distillation of the product absorbed by the active carbon about 70% consists of monovinylacetylene.

Example II

Acetylene at a temperature of 620° C. is caused to pass over a catalyst obtained by imbibing pumice stone with an aqueous solution of silver nitrate containing 1% of $AgNO_3$ and then reducing the silver nitrate into metallic silver by means of formic acid. The condensation of the products obtained is operated as in preceding Example I: in the cooler there condenses 20% of the total product obtained; the remaining 80% is absorbed by the active carbon.

The fractional distillation of the product condensed by cooling gives:

Beginning of distillation 72° C.

| | Percent by weight |
|---|---|
| From 72 to 85° C. distils | 13.6 |
| From 85 to 200° C. distils | 33.7 |
| From 200 to 260° C. distils | 23.1 |
| From 260 to 360° C. distils | 18.7 |
| Residue at 360° | 10.9 |

The fractional distillation of the product absorbed by the active carbon gives:

Beginning of the distillation —5° C.

| | Percent by weight |
|---|---|
| From —5 to 75° distils | 18.1 |
| From 75 to 85° distils | 52.2 |
| From 85 to 200° distils | 12.7 |
| From 200 to 260° distils | 9.4 |
| From 260 to 360° distils | 7.2 |
| Residue at 360° | 0.4 |

Of the fraction —5+75° C. about 72% consists of monovinylacetylene.

The present process has the advantage that it permits obtaining simultaneously aromatic hydrocarbons and monovinylacetylene in a very simple manner which eliminates all of the complications encountered in processes employing liquid catalysts. The yield obtained is extremely high: generally it is possible to obtain a quantity of products corresponding to 92%, and frequently as high as 95%, of the acetylene employed; this is due to the fact that decomposition of the acetylene is avoided in a manner practically complete, whilst the formation of methane, ethylene and their homologues is reduced to a minimum.

Having now particularly described and ascertained the nature of my said invention and in what manner the same is to be performed, I declare that what I claim is:

A process for simultaneously obtaining aromatic hydrocarbons and monovinylacetylene by thermic polymerization of acetylene consisting in causing acetylene to pass over a silver catalyst at a temperature of from 300° C. to 800° C., the parts of the apparatus employed for polymerising acetylene with which the hot acetylene comes in contact being constructed of a steel consisting of 0.01 to 0.05% carbon, an effective amount to 3.5% aluminum, 1% silicon, quantities less than 1% of molybdenum and vanadium, 4 to 24% chromium and the remaining substantially all iron.

MARIO ZAVKA.